(No Model.)
R. D. WILSON.
GATE FOR RAILWAY CARS.
No. 454,935. Patented June 30, 1891.
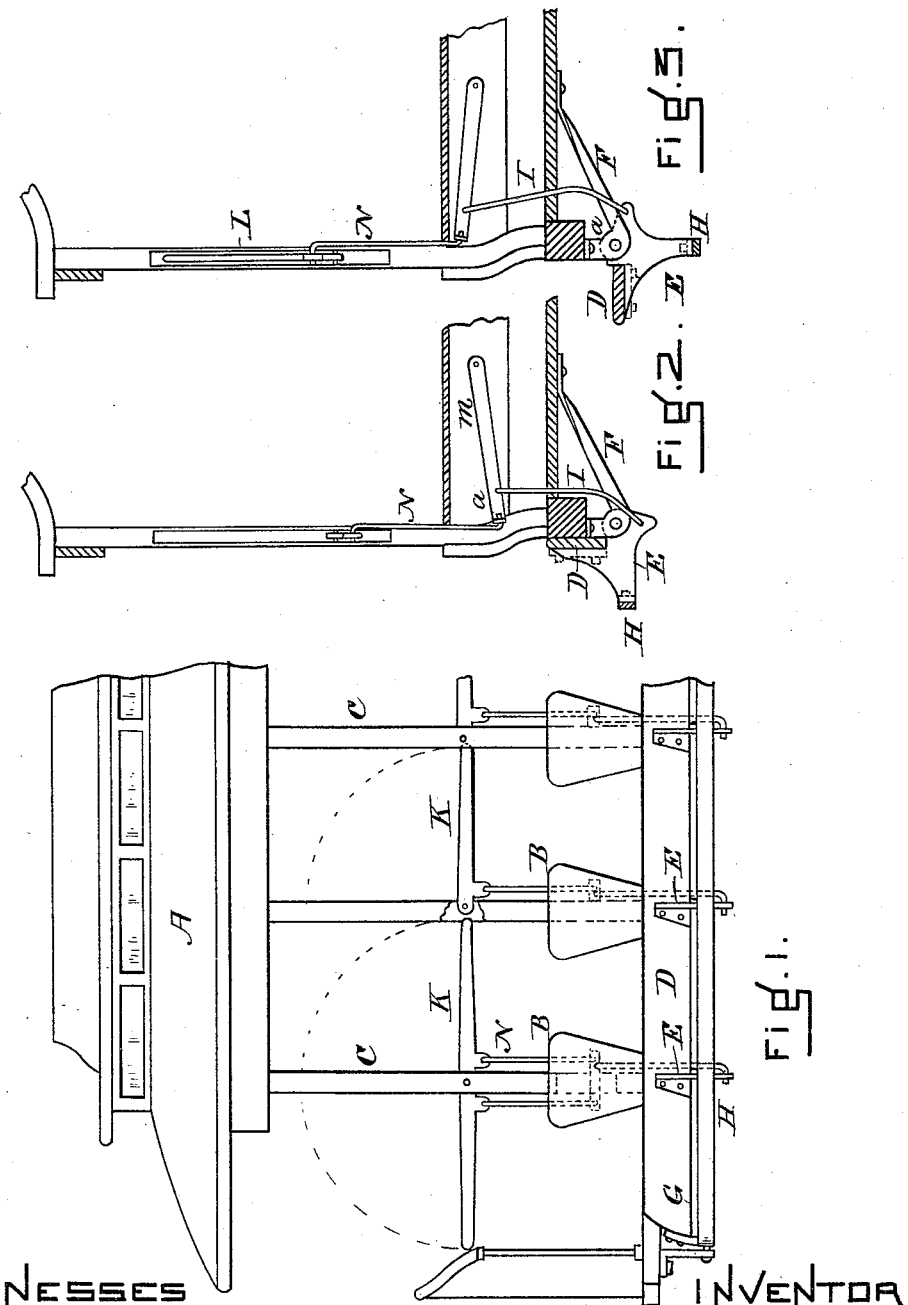
Witnesses
Frank G. Parker
Edward S. Day
Inventor
Robert D. Wilson
by his attorney
Chs. L. Hayes.

UNITED STATES PATENT OFFICE.

ROBERT D. WILSON, OF BOSTON, MASSACHUSETTS.

GATE FOR RAILWAY-CARS.

SPECIFICATION forming part of Letters Patent No. 454,935, dated June 30, 1891.

Application filed August 18, 1890. Serial No. 362,328. (No model.)

*To all whom it may concern:*

Be it known that I, ROBERT D. WILSON, of Boston, in the county of Suffolk and State of Massachusetts, have invented a new and useful Improvement in Gates for Railroad-Cars, of which the following, taken in connection with the accompanying drawings, is a specification.

The object of this invention is to provide a gate-bar for railroad-cars, which gate will prevent passengers from alighting from the car except upon one side, and which can be rendered available for use on either side of the car, according to the direction in which the car is moving.

To this end the invention consists of the combination, substantially as and for the purpose hereinafter set forth, of a hinged step, a hinged bar fixed on the side of the car, which bar when the step is turned up affords a barrier to entrance to or exit from the car, and when the step is turned down is removed out of the way, and mechanism connecting the hinged step to the bar, so that the movement of the step affects the movement of the bar.

I have represented my invention as applied to what is known as the "open car," in use on street-railroads, but it can be applied to a "box car" as well, and also can be applied to the cars used on steam-railroads.

In the accompanying drawings, Figure 1 is a view of my device in side elevation as applied to an open car. Fig. 2 is a sectional view showing the step turned up and the gate-bar turned down and extending across the space between the seats, and Fig. 3 is another sectional view showing the step turned down and the gate-bar turned up out of the way.

In the several figures the same letters refer to the same parts.

Referring to the drawings, A is the roof of the car.

B B are the seats.

C C are the side posts supporting the roof of the car, and D is the step or running-board. This step is attached at intervals to metal plates E, and these plates are pivoted on brackets F F, extending from the under side of the car, and in end brackets G G, attached to the front end of each platform. These plates project from the under side of the seat or running-board. At right angles to this board, and suitably secured to the projecting ends of these plates is a bar H, which is parallel to the running-board and at a distance therefrom about equal to the width of the board or step, so that when this board or step is turned up the bar acts as a guard and affords the proper protection to the car from the contact of vehicles with the same.

In order that when the step is turned down it may take a horizontal position at right angles to the position which it has when turned up, a suitable stop is provided which prevents the movement of the plates E farther than through an angle of ninety degrees. In the drawings this limitation of movement is affected by the contact of the bent end of the connecting-rod I with the bracket F.

K is a bar which is pivoted to the support or post C, and when drawn down extends across the space between the posts, so as to act as a gate; but when thrown up the bar fits into a groove L on the post. In order to afford a connection between the plates E and step D with the gate-bar K, a lever M at right angles to the bar K is pivoted under the seat. The end of this lever is bent, as shown at *a*, so that the end projects from beneath the seat, and to this end is connected a rod N, which is also connected to the bar K. The lower portion of the plate E is connected by a rod I with the end of the lever M, and thus, as shown in Figs. 2 and 3, turning down the step D throws up the gate-bar L, and turning up the step throws down the gate-bar.

I do not limit myself to the precise arrangement of mechanism shown and described for connecting the step to the gate-bar, and any other suitable device may be used.

On the end posts I would have two gate-bars and two levers, which gates act to simultaneously guard the space between the seat and the dash-board and the space between the end seat and the seat next to it.

It is obvious that this device may be used for guarding the platform of box street-cars or of steam-cars. This mechanism is placed on both sides of the car, and the running-board on the side of the car next to the other track is turned up and the connected gates are turned down, while on the other side the running-board is turned down and the gates are turned up. Passengers are therefore prevented from alighting from or getting onto a car on the side which is next to the other track, and liability to accident is prevented.

Having thus described my invention, what I claim, and desire to secure by Letters Patent of the United States, is—

1. The combination, substantially as and for the purpose set forth, with a railroad-car, of a hinged or pivoted step, a hinged or pivoted gate-bar preventing entrance to or exit from the car, and mechanism connecting said step and gate-bar, whereby turning up the step throws down the gate-bar, and vice versa.

2. The combination, substantially as and for the purpose set forth, with the car-body, of the hinged or pivoted step or running-board, and a guard-bar parallel to and moving with said step and attached to the said step at right angles thereto.

3. The combination, with the car-body and the brackets F G, attached to the under side of the car-body, of the plates E, hinged or pivoted to these brackets and swinging through an arc of ninety degrees, a suitable stop for limiting the movement of the plates, the step or running-board D, attached to the plates, and the guard-bar H, attached to the plates at a distance from the step which is equal or nearly equal to the width of the step and an imaginary arch passing through said point and the point of attachment of the step ninety degrees distant from the said point of attachment.

4. The combination, substantially as and for the purpose set forth, of the hinged plates E, carrying the step or running-board D and the guard-bar H and supported from the body of the car by brackets, the gate-bar L, hinged in the side of the car, and mechanism connecting the gate-bar to the hinged plate, whereby the movement of the plate causes the movement of the gate-bar.

5. The combination, substantially as and for the purpose set forth, of the hinged or pivoted plates E, the hinged gate-bar K, the lever M, bent at one end and pivoted under the seat to the side of the same, and the connections I and N.

In testimony whereof I have signed my name to this specification, in the presence of two subscribing witnesses, on this 14th day of August, A. D. 1890.

ROBERT D. WILSON.

Witnesses:
FRANK G. PARKER,
ALEX L. HAYES.